United States Patent [19]
Mattheis et al.

[11] Patent Number: 5,944,800
[45] Date of Patent: Aug. 31, 1999

[54] DIRECT MEMORY ACCESS UNIT HAVING A DEFINABLE PLURALITY OF TRANSFER CHANNELS

[75] Inventors: Karl-Heinz Mattheis, San Jose, Calif.; Peter Rohm, Pfaffenhofen, Germany

[73] Assignee: Infineon Technologies Corporation, San Jose, Calif.

[21] Appl. No.: 08/928,558

[22] Filed: Sep. 12, 1997

[51] Int. Cl.⁶ .................................................. G06F 13/14
[52] U.S. Cl. ................................................ 710/23; 710/72
[58] Field of Search .................... 395/821, 892, 395/725; 710/1, 22, 72, 23

[56] References Cited

U.S. PATENT DOCUMENTS

| | | | |
|---|---|---|---|
| 4,751,634 | 6/1988 | Burrus, Jr. et al. | 364/200 |
| 4,797,809 | 1/1989 | Sato et al. | 364/200 |
| 4,896,261 | 6/1990 | Nolan | 364/200 |
| 5,179,663 | 1/1993 | Iimura | 395/250 |
| 5,212,795 | 5/1993 | Hendry | 395/725 |
| 5,297,242 | 3/1994 | Miki | 395/425 |
| 5,613,162 | 3/1997 | Kabenjian | 395/842 |
| 5,619,727 | 4/1997 | Chen et al. | 395/842 |
| 5,644,754 | 7/1997 | Weber et al. | 395/500 |
| 5,655,151 | 8/1997 | Bowes et al. | 395/842 |
| 5,809,335 | 9/1998 | Kamiya | 395/842 |

*Primary Examiner*—Thomas C. Lee
*Assistant Examiner*—Abdelmoniem I Elamin

[57] ABSTRACT

Th present invention relates to a DMA-controller having a definable plurality of transfer channels. According to the present invention such a unit comprises a data processing unit with a bus interface unit being coupled with a bus for transferring data. The data processing unit executes a data transfer on said bus dependent on programmable parameters. It further comprises a parameter memory storing those parameters for each transfer channel, whereby the parameter memory provides a first memory area which stores for each defined transfer channel a word comprising a vector address to a second memory area comprising specific parameters for said transfer channel.

22 Claims, 4 Drawing Sheets

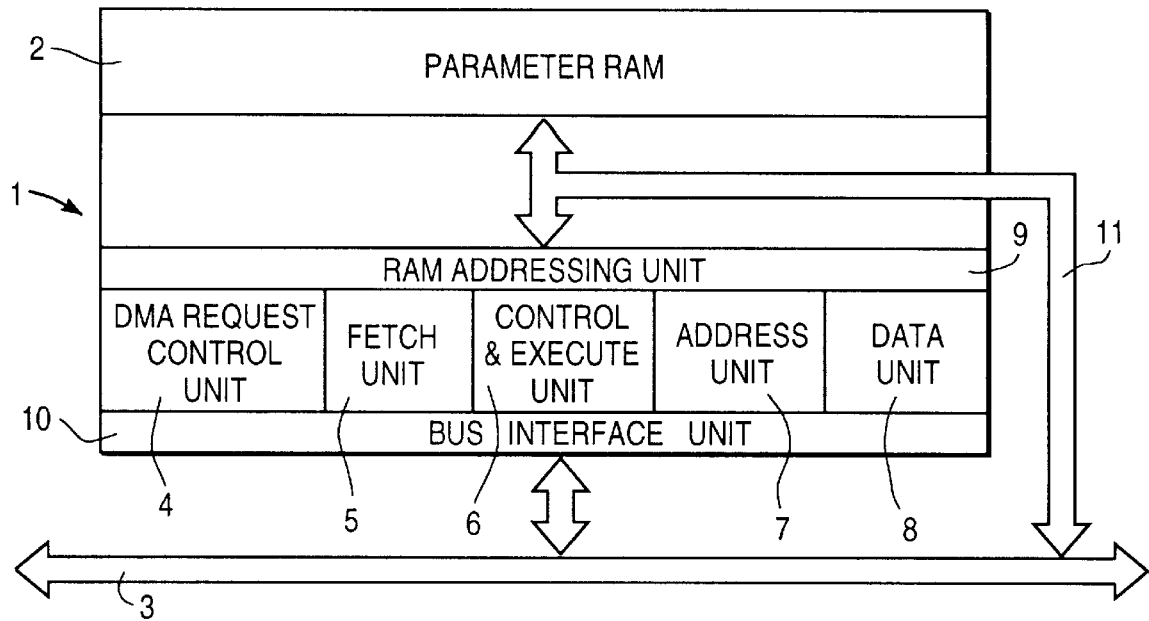
FIG_1
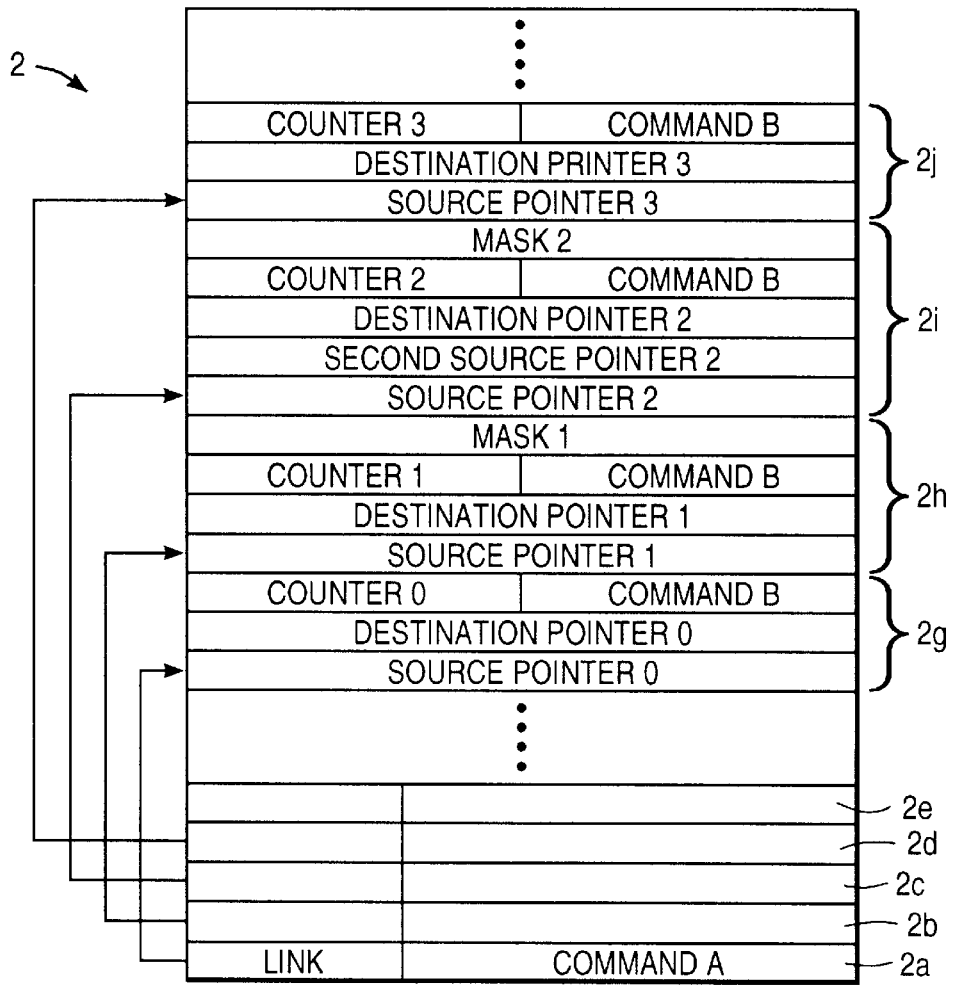
FIG_2

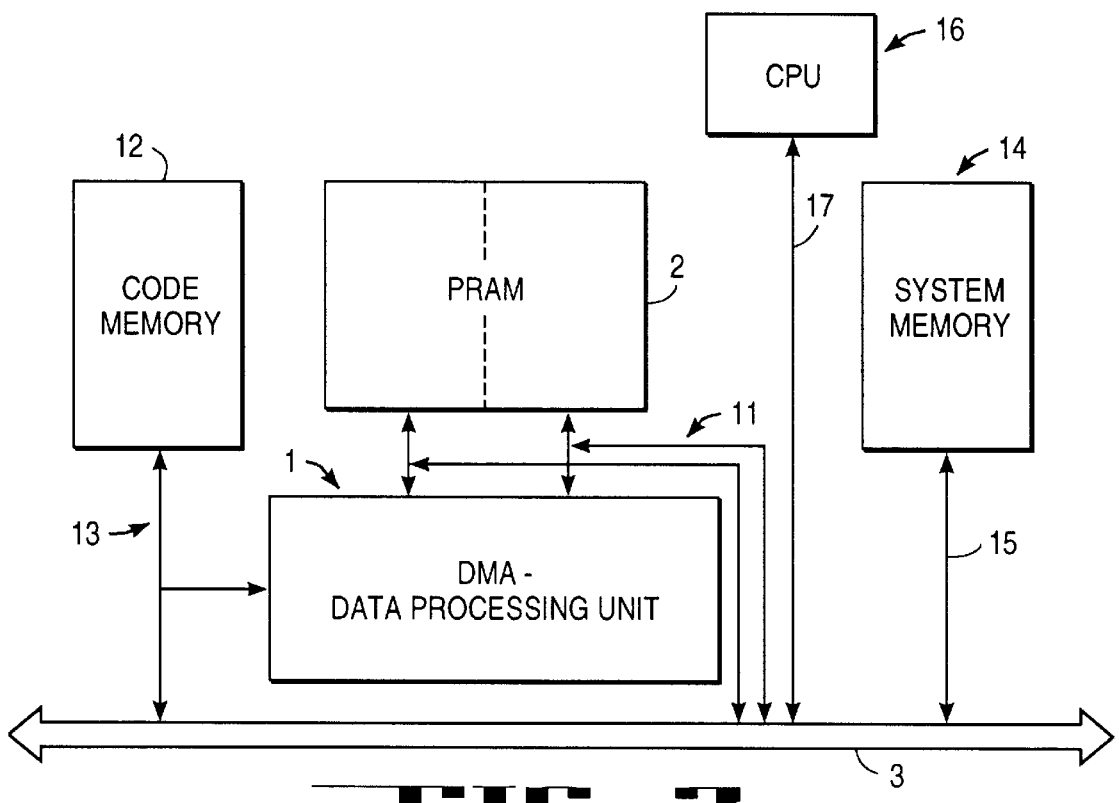
FIG_3
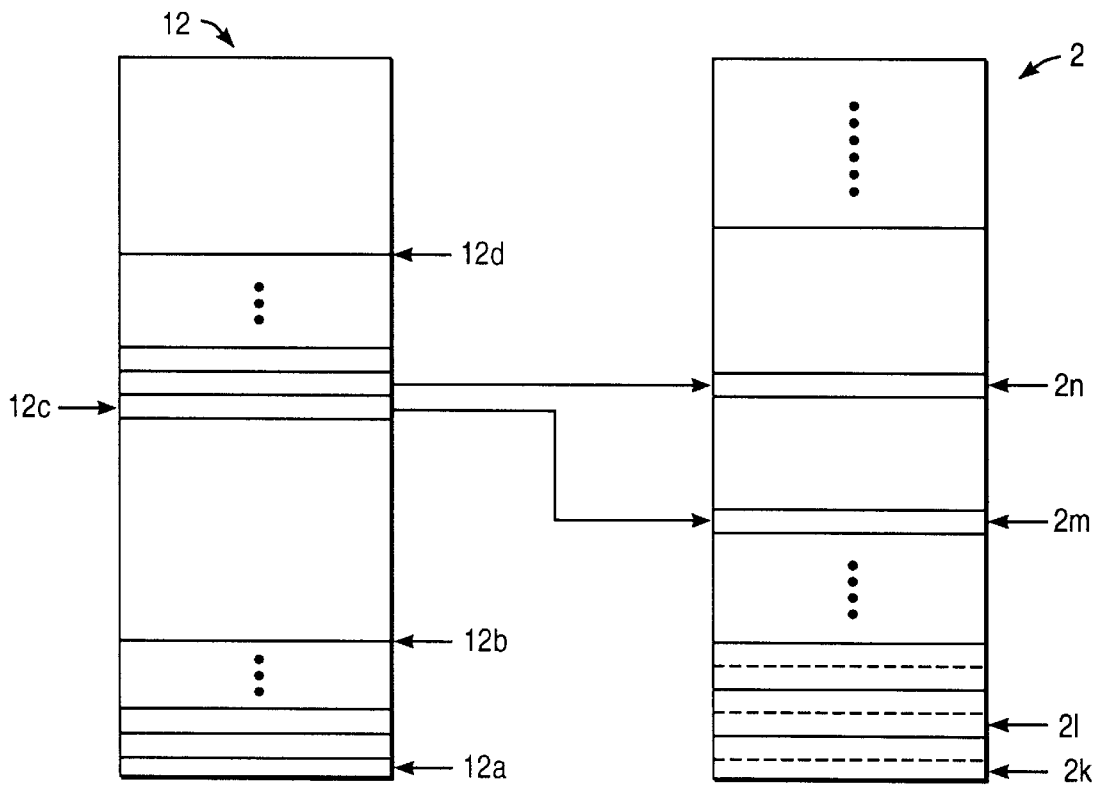
FIG_4

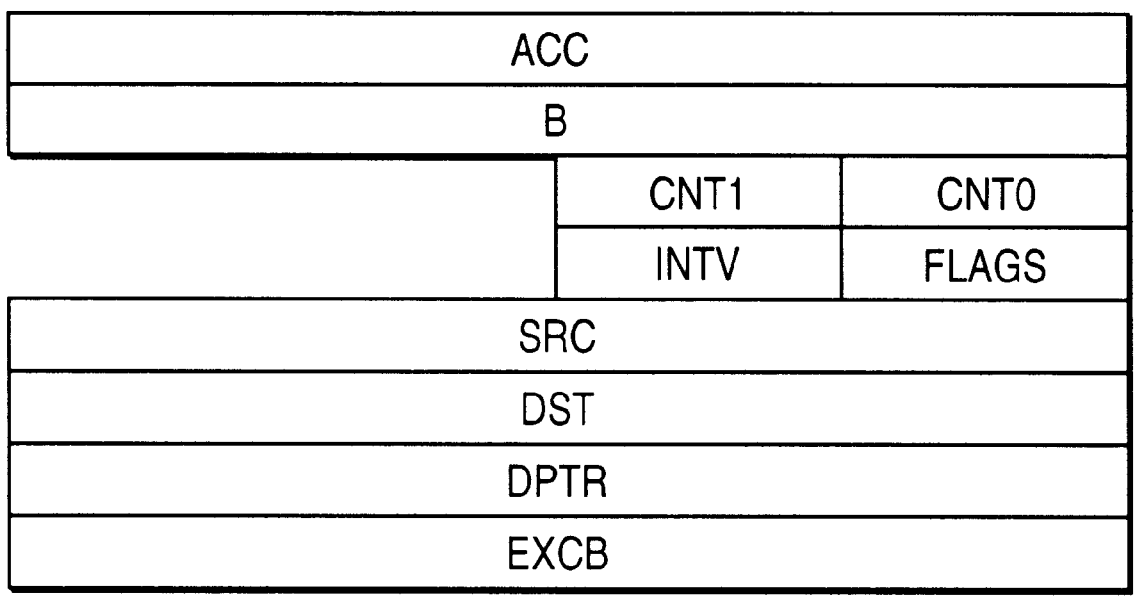
FIG_5

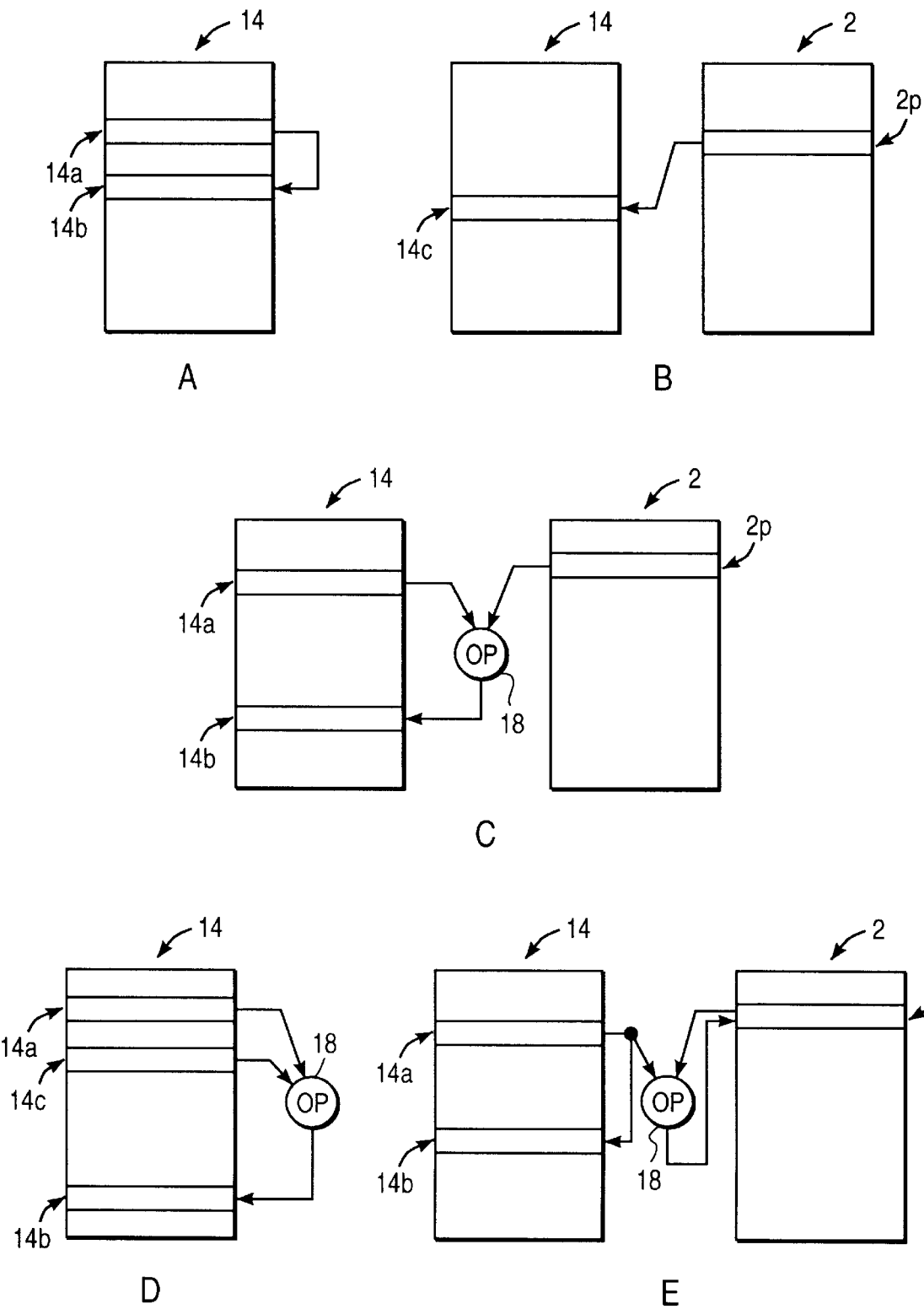
FIG_6

DIRECT MEMORY ACCESS UNIT HAVING A DEFINABLE PLURALITY OF TRANSFER CHANNELS

BACKGROUND OF THE INVENTION

The present invention relates to a direct memory access (DMA) unit having a definable plurality of transfer channels. Normal DMA-units, also called DMA-controller, only allow transfer of data or portions of data from one memory or I/O location to another.

SUMMARY OF THE INVENTION

Therefore, it is an object of the present invention to provide a DMA-controller with greater versatility. This object is accomplished by a direct memory access unit having a definable plurality of transfer channels. According to the present invention such a unit comprises a data processing unit with a bus interface unit being coupled with a bus for transferring data. The data processing unit executes a data transfer on said bus dependent on programmable parameters. It further comprises a parameter memory storing those parameters for each transfer channel, whereby the parameter memory provides a first memory area which stores for each defined transfer channel a word comprising a vector address to a second memory area comprising specific parameters for said transfer channel.

In another embodiment according to the invention the direct memory access unit with a definable plurality of transfer channels comprises a code memory for storing instructions, a data processing unit connected to said code memory with a bus interface unit being coupled with a bus for transferring data, whereby the data processing unit executes a data transfer on this bus by executing a program stored in the code memory, and which is dependent on programmable parameters, a parameter memory storing the parameters for each transfer channel, whereby the code memory provides a first memory area and a second memory area. The first memory area stores for each defined transfer channel an entry point address in the second memory area. The second memory area contains at least one program sequence.

Such a type of direct memory access according to the present invention has much more flexibility and functionality. It can be easily extended to not only perform simple data transfers, but also to monitor the transferred data values and even performs operations on them.

BRIEF DESCRIPTION OF THE DRAWINGS

FIG. 1 shows a basic block diagram of a first embodiment of a direct memory access unit according to the present invention, FIG. 2 shows an example of the channel programming in the parameter memory, FIG. 3 shows a basic block diagram of a second embodiment of a direct memory access unit according to the present invention, FIG. 4 shows an example of the organization of the code memory and the parameter memory, FIG. 5 shows an example of an register set of a data processing unit of the second embodiment, and FIG. 6 shows five examples of DMA service routines.

DESCRIPTION OF THE PREFERRED EMBODIMENT

According to FIG. 1 a first embodiment of a direct memory access controller, which is for example integratable into a single microcontroller or microcomputer, comprises a data processing unit 1 with a random access memory (RAM) addressing unit 9, a DMA request control unit 4, a fetch unit 5, a control and execute unit 6, an address unit 7, a data unit 8 and a bus interface unit 10. The bus interface unit 10 couples the DMA-controller with a system bus 3, which glues a complete data processing system with, for example, a microcontroller or microcomputer, a system memory and additional necessary peripheral units. The RAM addressing unit 9 couples the data processing unit 1 with a parameter RAM through a bus 11, which is also coupled with the system bus 3, to allow programming of the parameter RAM 2 by a microprocessor.

The number of registers (mainly pointers) required for a DMA channel is dependent on the functionality required. A channel which is intended to simply perform a data transfer needs at least a source and a destination pointer, a transfer counter, and some control bits to specify the optional modification of the pointers. A high functionality channel may need up to three source pointers, one or two destination pointers, some registers to store constants used to modify the data during the transfer, a transfer counter, and a certain amount of control bits to specify the desired operation. One traditional way to serve these needs would be to implement a certain amount of channels with simple functionality, and another amount of channels with middle or high functionality. However, this approach could only offer a fixed partitioning of these channels. If a user requires more simple channels than implemented, he could use the high functionality channels for these simple tasks, but with additional costs. If a user requires more high functionality channels, there would be no way to use some of the low functionality channels for this purpose. They are useless for him. In addition, such an implementation could limit the freedom to assign a user defined ordering and prioritization to these channels.

In order to avoid this dilemma and to provide greatest flexibility to the user, the DMA-unit according to the present invention takes another approach. Instead of offering a fixed number of channels with a predefined functionality, the user can setup the number and the functionality of the channels in a parameter-memory 2 in the order as required by his application. Now the channel number and functionality is only limited by the size of this memory 2. The partitioning of the channels into low, middle, or high functionality, and the ordering and prioritization, however, is totally programmable.

The DMA Request Unit 4 performs the arbitration of the different source's requests and grants service to the request which has the highest priority at a given time. The Fetch Unit 5 accesses the channel parameters in the parameter RAM 2 according to the function specified via each channel's command word. The Control & Execute Unit 6 controls the address and data paths. Pointer modifications are handled through the Address Unit 7, while data operations are performed in the Data Unit 8. The Bus Interface Unit 10 provides the proper connection to the system bus.

The parameter RAM (PRAM) 2 of the DMA-unit 1 is used to store the commands, pointers, link pointers, transfer counters and optional data parameters of the DMA channels. In addition, some temporary storage locations might be required for special operations.

FIG. 2 shows an example for the usage of the PRAM. The PRAM is organized as a 32-bit wide RAM array (other organizations are possible). The size of the PRAM is scalable such that derivatives can be built according to the needs of different application areas requiring a different number of DMA channels. The minimum reasonable size of the PRAM could be 64 bytes, which would allow to use two to four DMA channels, depending on the desired complexity of the channels. Any maximum size is possible dependent of the capabilities of the DMA-controller, for example 4 Kbytes would be capable of storing the parameters of 64 complex channels in this example.

Since the parameters in the PRAM have to be read, modified, and written back to the PRAM (e.g. pointer increment), the PRAM is preferably a dual-port memory to provide parallel reading and writing performance. This allows a pipeline scheme to be implemented where some parameters are read and others are written back at the same time.

The lower address range forms a first memory area of the PRAM and is special in that it is used as a vector table. The priority number of the source granted the DMA service is used to point into that vector table to specify the DMA channel which was requested. For this purpose, the priority number, for example, can be shifted left by 2 (for a 32-bit wide PRAM) and then used as the direct address to a 32-bit word in the PRAM. This location contains the first command for the requested channel, and a link address pointing to the PRAM address where the other parameters of that channel are stored.

The maximum size of the vector table can be limited, for example to 64 words, for a maximum of 64 channels. If less channels are programmed, the size of the vector table decreases accordingly. The vector table entries not used can be used to store the parameters of the channels. To get optimal performance, the channels and the priority numbers of the peripheral sources requesting DMA service should be programmed such that the vector table always starts at PRAM location 0 and grows upwards contiguously.

The DMA channels are set up in the parameter RAM (PRAM) 2 of the DMA-unit. Depending on the required function of a channel, a different number of PRAM locations is needed in order to specify all necessary parameters for the operation. Thus, the number of channels which can be programmed is depending on the amount of PRAM and the desired functionality of the channels. As an example, with a 128-byte PRAM, eight channels requiring four PRAM locations, or four channels requiring eight PRAM locations can be programmed. Any combination is possible, up to the size of the PRAM.

Each channel has at least one command word 2*a*, 2*b*, 2*c*, 2*d*, 2*e*. . . , specifying the overall functionality of that channel, and a link address 2*f* pointing to the further parameter locations of that channel as shown in FIG. 2. In addition, depending on the functionality, one or more source and destination pointers, a transfer counter, data values, temporary locations and a second command word might be required. These parameters are stored for the first channel in location 2*g*, whereas link pointer 2*f* points to this address location. Memory locations 2*h* contain the parameters for channel 1, Memory locations 2*i* and 2*j* for channels 2 and 3, respectively. The size of each parameter field stored in the respective locations depends on the command word stored in the first memory area. In this example, channel 0 occupies three words, channel 1 four words, channel 2 five words, and channel 3 three words.

Each DMA channel can contain two command words: the first command a, stored in the first memory area, specifies the overall transfer operation to be performed, while the second command b, stored in the second memory area, specifies a possible operation with the transferred data information.

If the DMA- unit has the highest priority on the system-bus a measure can be implemented to avoid complete bus locks by the DMA due to errors or false programming. For this purpose, the bus interface of the DMA can contain a time-out counter unit. It is set to a default value after reset, but the user can have the option to reprogram this unit. This unit should operate in two ways: One is that it counts the number of transfers in burst mode and forces the DMA to release the bus when a pre-programmed number of transfers has been reached. Possibly this can be made conditionally, such that a termination of the burst is only performed if other system-bus requests are present. A separate connection from the system bus controller to the DMA could be used for the purpose of telling the DMA that another bus request is present. The DMA then releases the bus after its maximum number of transfers in a burst has been reached. If no requests are present, the DMA can continue its burst transfer. The second operation of the time-out unit is that it additionally monitors the time. In this way, bus transfers being too long will also be aborted.

After each transfer, the pointers are automatically updated according to the control information stored in the command word. The options are:

modify none of the pointers, increment/decrement the source pointer, increment/decrement the destination pointer, or increment/decrement both, the source and the destination pointer.

The increment/decrement step is determined by the size of the data type(s). Here, separate control is required to specify the type of the source and the destination data (see also 'Data Type Conversion'). For example, if data is fetched from a byte peripheral and stored into a word-organized memory, the source pointer has to be modified by 1, while the destination pointer is modified by 4 in order to comply with the data type.

In this embodiment, two basic transfer modes can be implemented: single-address transfer and dual-address transfer.

1. Single-Address Transfer

For this transfer mode either the source or the destination has to be a device which can operate in response to a data acknowledge signal (usually a peripheral device). While it is read or written only in response to that data acknowledge signal without an additional address, the other device, usually a memory, is accessed with an address to specify the location to read from or write to. These transfers are handled in one bus cycle. The data transferred in this case does not pass through the DMA unit; it is only visible on the bus for one cycle.

This address mode is usually required by some high-performance peripheral devices which have large portions of data to be transferred in a block. Thus, these peripheral contain either memory blocks or FIFOs to hold the data. These memories are only justified for highly specialized intelligent peripherals.

2. Dual-Address Transfer

In this mode, both the device to be read and the device to be written are accessed via an address. Thus, in this case two bus cycles are required: one to read the data and store it temporarily in the DMA unit, and a following one to write it to the destination. Since the data transferred passes through the DMA unit, all data operations specified for the DMA-UNIT can be performed on or with the data. The examples given below always use the dual-address transfer mode.

The DMA allows data to be transferred between memories and/or peripherals which have different bus widths. The DMA unit according to this invention has respective storing means to perform an automatic conversion of the data types, e.g. read four consecutive bytes from a byte peripheral and store them as one word (32-bits) into memory and vice versa. The conversion of single bits to bytes and words and vice versa is also possible. It can be programmed using the shift and rotate operations of the data unit which will be explained in more detail below. This option allows, for example, to input or output a bitstream via a port pin. Serial transfers can be emulated in this way.

Gathering and scattering of data can also be supported by a DMA unit according to the present invention. This offers the option to move non-contiguous blocks of data to one contiguous block or vice versa. For this purpose, linked lists are set up in the system memory. Each element of a linked list is associated with one block of data and contains the number of data bytes, the pointer to that data table, and a pointer to the next list element. The last list element is a zero value for the number of bytes. This condition terminates the DMA transfer. The DMA channel for such an operation is set up with a command, a pointer to the first element of the linked list in memory, a source or destination pointer (source pointer for data scattering, destination pointer for data gathering). The second command in the channel can be used to specify operations to be performed with the transferred data.

Instead of generating an interrupt request to the CPU when a channel program has ended, a request to another DMA channel can be generated. This request follows the same prioritization scheme as all service requests to DMA channels. Using this option, channels can be linked together, such that after the termination of one channel program another channel program can be invoked. As with every service request node, either a standard interrupt service or a DMA service can be requested. This is also true for the service request nodes of the DMA channels itself. The distinction between these two types of service requests is made via a control bit in the service request control register (not shown).

Unlike standard DMA controllers, the DMA-unit according to the present invention can perform operations on or with the transferred data. In this way, the DMA-unit can offload the CPU from tasks such as masking off certain portions of data information before operating with it. But the DMA-unit can do more in that it can service peripherals without any CPU intervention. Operations such as adding a new time-out value to a compare register or increasing the pulse-width of a PWM signal until a predefined maximum value is reached can be completely performed through the DMA-unit of the present invention without any requirement of interrupting the CPU.

A data processing unit 1 can for example execute the following operations: Add, Subtract, Compare, AND, OR, XOR, Shift Left or Shift Right, etc.

The priority number stored in each service request node control register is used to determine both, the priority of the service request and the channel number that is requested. The range of priority numbers allowed, in this example, is from 0 through 63, however, if less than 64 channels are programmed in the DMA, the range may only be from 0 to the programmed number of channels - 1. Requesting a channel which is not set-up in the DMA will lead to false operation and can, for example, cause an interrupt.

The channels of the DMA unit can be prioritized through hardware, such that the highest channel number always has the highest priority (Channel 0: lowest priority; Channel 63: highest priority). With this, the priority number determined at the end of an arbitration round directly determines the service channel number. If less than 64 DMA channels are implemented, the numbering of the channels, and therefore their priority ranking, always should start from 0 to the given maximum number.

In a second embodiment, shown in FIG. 3, The DMA-unit has even more capabilities. The parameter RAM 2 is organized in 64 bits in this example. In addition to the parameter RAM 2, a code memory 12 is provided which contains execution code for the DMA-unit. The code memory 12 can be any volatile or non-volatile memory, such as a read only memory or a static random access memory. Preferably, the code memory 12 is a flash memory to contain predefined DMA routines. The code memory 12 is couples via bus lines 13 with the data processing unit I and with the system bus. In addition, FIG. 3 shows a central processing unit 16 coupled to the system bus 3 through line 17 and a system memory 14 coupled to the system bus through lines 15. The PRAM 2 can be organized in double words as shown by the dotted lines. In this embodiment, the PRAM is organized in 64 bits.

The left side of FIG. 4 shows how the code memory 12 can be organized. The code memory 12 is divided into four areas. The first area starts at 12a and stores the entry table pointer, which can contain one or two entries per active channel. Each entry table pointer 12a points into a second code memory area which starts at 12b and which can store a plurality of different DMA-service routines. These routines can be programmed by the CPU 16 connected to the system bus 3 or they can be preprogrammed in a read only memory. The third area starts at 12c and contains the parameter table pointer which point to the respective parameters stored in the parameter memory 2. Two of the parameter fields start in the example shown in FIG. 4 at locations 2m and 2n. The fourth area starting at 12d can contain additional code, if necessary.

The right side of FIG. 4 shows the organization of the parameter RAM 2. A lower part starting at 2k contains the minimum amount of parameters necessary for one DMA channel. Thus, this first area is divided into equal parts for each channel, for example two words containing four parameters for each channel. The first two parameter areas are shown in FIG. 4 by pointers 2k and 2l. The second area starts at pointer 2m and is the area which contains additional parameters that are stored in the same manner as in the first embodiment. The size for each channel depends on the definition of each channel, defined by either the entry table pointer or the parameter table pointer for each channel.

The DMA unit can have a set of registers like a microprocessor. An example for such a register set can be seen in FIG. 5. 10 Registers are used. Registers ACC, B, SRC, DST, DPTR and EXCB are, for example, 32 bits wide. Register CNT1, CNT0, INTV and FLAGS are each 8 bit wide. 6 of the ten registers need to be stored in the first parameter area to allow a switch between different channels. These parameters are the accumulator ACC, the interrupt vector register INTV, a flag register FLAG, one of the count registers CNT1/CNT0, the source register SRC, and the destination register DST. As each word in the parameter register is 64 bits wide, 2 words are used to store these 6 parameters, as shown in FIG. 4. The EXCB register can be used for code space extension. The DPTR register stores an parameter pointer 12c from code memory 12 and the B register can be used for general purposes.

When a channel is started the 6 registers are loaded implicitly from the respective locations 2k, 2l in the PRAM 2 into the working register set. The channel parameter pointer 12c is loaded from code memory 12 into the register DPTR to point to the respective parameters stored in the PRAM 2. The program counter (not shown in FIG. 5) is loaded with the respective entry table pointer 12a from code memory 12 and the respective DMA service routine stored in code memory 12b is executed. In this example channel 0 has an entry table pointer 12a, a parameter pointer 12c, general parameters at 2k, a parameter field starting at 2m, and a routine starting stored in the code area which begins at the code base pointer 12b.

If such a channel switching is performed in a predefined order, the DMA-unit can start operation before all parameters are loaded. For example, if first the source address, a program counter and associated flags are loaded the DMA-unit can already start operation without having the destination address. While loading the destination address it can already perform a first read cycle to get data to be transferred.

The second embodiment operates generally as the first embodiment. In addition, a wide variety of different service routines can be programmed into the code memory 12, thus allowing a flexible handling of the DMA-unit. If a RAM is used as a code memory, the CPU must program the code memory 2 during an initialization phase. In this case, the CPU can change the programming of the DMA-unit during execution of a program if necessary. If the code memory 12 is a ROM or a flash memory, the code memory can be pre-programmed depending on the purpose of the system with specific customized DMA-service routines.

In the following, as shown in FIG. 6, 5 examples A–E are given for some of the various operations of the DMA-unit according to both embodiments described above. Note that single transfers are shown, however, these operations can also be performed in burst mode. For each of the examples, the required channel parameters and the DPI bus operation are given.

FIG. 6A shows a simple DMA transfer which needs four parameters, stored in 1 word in the first parameter memory area and 3 words in the second parameter memory area. These parameters are shown in FIG. 2 in memory area 2g or 2j. Command a defines this operation, whereas the source pointer 14a defines the source address and the destination pointer 14b defines the destination address. The counter stores the number of bytes/words to be transferred. The pointers are automatically incremented or decremented.

FIG. 6B shows the moving of a constant, for example, to reload a peripheral timer. Also four parameters are needed as above. The source pointer 2p in this case stores a constant which is stored into the destination pointer 14c. The destination pointer can be incremented or decremented or keep its content.

FIG. 6C shows how to manipulate a transfer with a constant and to store the result to a different location (example: subtract a fixed offset from an A/D value). In this example, 4–5 parameters are needed, stored in 1 word in the first parameter memory area and 4 words in the second parameter memory area. These parameters contain in addition a constant which is combined in an operation, defined by, for example, the command b, with each byte/word that is transferred. The operation is done by an operator 18 and can be of any arithmetic or logical kind. In the first embodiment it can be defined by command b and in the second embodiment by the respective program stored in code memory 12. In addition this byte/word can be masked by the respective mask parameter. The parameters are, for example, shown in FIG. 2 in memory area 2i. The second destination pointer 2p contains here the constant.

FIG. 6D shows how to manipulate a transfer with a second operand (example: subtract a measured pulse width from the pulse period). In this example also 4–5 parameters are needed, stored in 1 word in the first parameter memory area and 4 words in the second parameter memory area. These parameters contain instead of a constant a second pointer 14c which points to data that is combined in an operation by operator 18, defined by, for example, the command b or the respective program, with each byte/word that is transferred. In addition this byte/word can be masked by the respective mask parameter. The parameters are, for example, shown in FIG. 2 in memory area 2i.

FIG. 6E shows the accumulating within the PRAM and optionally doing a transfer (example 1: store measured single time values into table and sum the total elapsed time; example 2: calculate checksum). In this example also 4–5 parameters are needed, stored in 1 word in the first parameter memory area and 4 words in the second parameter memory area. While each byte/word is transferred it is also combined by an operator 18 with one of these parameters 2p and stored in that parameter 2p. In addition this byte/word can be masked by the respective mask parameter. The parameters are, for example, shown in FIG. 2 in memory area 2i. The second destination pointer stores here the value.

This DMA-unit, according to the embodiments of the present invention, can service a large amount of peripheral events in parallel to the CPU, where in conventional systems the CPU has to undergo the burden of an interrupt service routine. With such a DMA-controller, one can perform the following operations:

simply move data between any two memory or I/O locations.

move data between the parameter RAM and any memory or I/O location, read a data, modify it, and store the result, move data until a predefined data value has been detected, read data, compare it to predefined limits and conditionally perform appropriate actions, read data and accumulate it to previously read data, move data and accumulate it to previously read data, and read two data values, perform an arithmetic or logical operation, and store the result. This functionality can be used to handle many service operations required by peripherals, which normally would have to be performed through an interrupt service routine via the CPU, with all the overhead involved with this. The following lists just some application examples for the use of such a DMA-controller:

reload a peripheral register with a constant (e.g. reload a timer), modify a bit or bit field in a peripheral register (e.g. start or stop a timer or the A/D converter), accumulate values retrieved from peripherals (e.g. accumulate pulse period measurements), move data only if its value matches predefined limits (e.g. monitor certain voltage limits on analog inputs), and add values to peripheral registers (e.g. calculate next compare event for PWM generation, etc.).

In addition, one can use the DMA-unit to perform check operations on the CPU or peripherals. Calculation results from the CPU can be checked against predefined ranges with the use of the DMA-unit. The integrity of peripheral control registers can also be monitored e.g. by comparing their contents to a predefined table stored in memory with the use of the DMA-unit.

With a DMA-unit according to the second embodiment, the functionality is almost unlimited, as respective programs can handle and manipulate any kind of data.

We claim:

1. Direct memory access unit having a definable plurality of transfer channels comprising:

a data processing unit having a bus interface unit being coupled with a bus for transferring data, said data processing unit executing a data transfer on said bus dependent on programmable parameters; and a parameter memory storing said parameters for each transfer channel, whereby said parameter memory provides a first memory area storing for each defined transfer channel data comprising a vector address to a second memory area comprising specific parameters for said transfer channel and a transfer instruction defining the number of parameters stored in said second memory area.

2. Unit as in claim 1, wherein said data processing unit comprises a data manipulating unit which upon said programmed parameters is able to alter said data being transferred on said bus.

3. Unit as in claim 2, wherein said manipulating unit comprises an arithmetic operator.

4. Unit as in claim 2, wherein said manipulating unit comprises a logical operator.

5. Unit as in claim 2, wherein said manipulating unit comprises a compare unit.

6. Unit as in claim 1, wherein said parameters comprise a source pointer, a destination pointer, a transfer counter, and a channel command.

7. Unit as in claim 6, wherein said parameters further comprise a data manipulate register.

8. Unit as in claim 7, wherein said parameters further comprise a second source pointer.

9. Unit as in claim 1, wherein said parameter memory is a dual port memory.

10. Direct memory access unit having a definable plurality of transfer channels comprising:

a code memory storing instructions, a data processing unit connected to said code memory having a bus interface unit being coupled with a bus for transferring data, said data processing unit executing a data transfer on said bus by executing a program stored in said code memory, and which is dependent on programmable parameters, wherein said parameters comprise a source pointer, a destination pointer, a transfer counter, and a channel command; and a parameter memory storing said parameters for each transfer channel, whereby said code memory provides a first memory area and a second memory area, said first memory area storing for each defined transfer channel an entry point address in said second memory area, said second memory area containing at least one program sequence.

11. Direct memory access unit as in claim 10, wherein said code memory provides a third memory area storing for each defined transfer channel a word comprising a vector address to a fourth memory area comprising specific parameters for said transfer channel.

12. Unit as in claim 11, wherein said fourth memory area is located in said code memory.

13. Unit as in claim 11, wherein said fourth memory area is located in said parameter memory.

14. Unit as in claim 10, wherein said code memory is connected to said bus.

15. Unit as in claim 10, wherein said code memory is a non volatile flash memory.

16. Unit as in claim 10, wherein said data processing unit comprises a data manipulating unit which upon said programmed parameters is able to alter said data being transferred on said bus.

17. Unit as in claim 16, wherein said manipulating unit comprises an arithmetic operator.

18. Unit as in claim 16, wherein said manipulating unit comprises a logical operator.

19. Unit as in claim 16, wherein said manipulating unit comprises a compare unit.

20. Unit as in claim 10, wherein said parameters further comprise a data manipulate register.

21. Unit as in claim 10, wherein said parameters further comprise a second source pointer.

22. Unit as in claim 10, wherein said parameter memory is a dual port memory.

* * * * *